T. W. HANKINS.
SANITARY MILKING PAIL.
APPLICATION FILED NOV. 17, 1909.
970,816.
Patented Sept. 20, 1910.
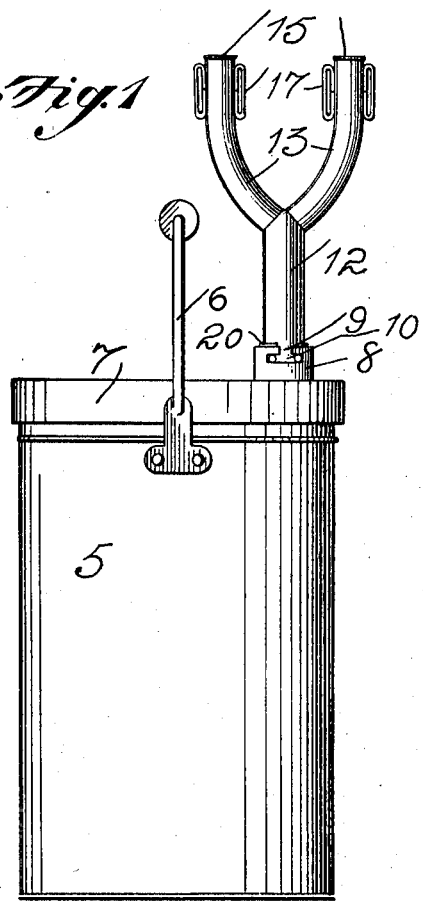
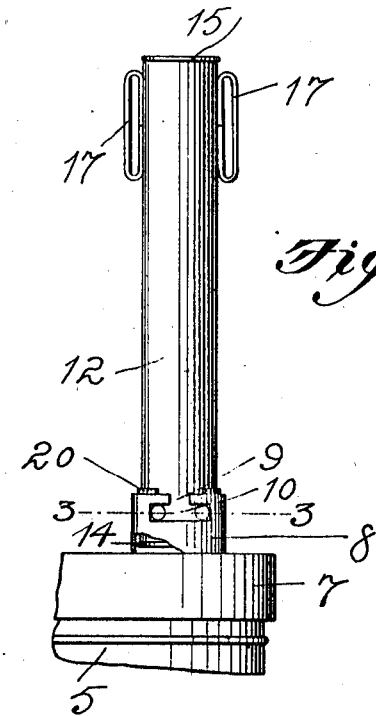
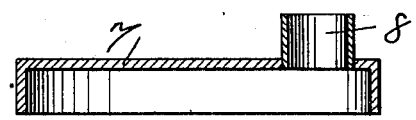
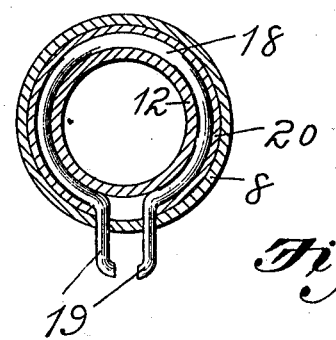
WITNESSES
INVENTOR
Thomas W. Hankins
By Attorneys

UNITED STATES PATENT OFFICE.

THOMAS WALTER HANKINS, OF STELLA, MISSOURI.

SANITARY MILKING-PAIL.

970,816.      Specification of Letters Patent.   Patented Sept. 20, 1910.

Application filed November 17, 1909. Serial No. 528,544.

*To all whom it may concern:*

Be it known that I, THOMAS W. HANKINS, a citizen of the United States, residing at Stella, in the county of Newton and State of Missouri, have invented certain new and useful Improvements in Sanitary Milking-Pails, of which the following is a specification.

This invention relates to certain new and useful improvements in milking pails.

The object of my invention is twofold: First I aim to provide a sanitary milking pail so constructed that the vessel will be entirely closed except where conduit enters collar, to prevent any foreign substance entering the pail; and secondly I aim to provide an elastic, pliable duct arranged to be secured to the cow's teats, which are manually manipulated therethrough in the usual manner.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification, and in which like numerals of reference indicate similar parts in the several views, Figure 1 shows an elevational view of a sanitary milking pail embodying my invention. Fig. 2 shows an enlarged elevational view of a modification thereof. Fig. 3 is a section on line 3—3 of Fig. 2. Fig. 4 shows a sectional detail of the lid.

In the accompanying drawings the numeral 5 designates a suitable milk pail having the handle provided with a bail 6. Secured to this pail 5 is the lid 7 having an aperture through which extends the tubular collar 8 having the slot 9 entering from the upper edge and continuing in the enlargement 10 as clearly disclosed in Figs. 1 and 2. Arranged to be detachably connected to the collar 8, is the duct or conduit 12 from which branch the two similar duct or tube members 13, this conduit preferably being made of soft rubber. Near the lower end I provide the strengthening bead 14 while each upper duct section is also provided with an edge bead 15 intended to strengthen the duct at its end. These similar duct members 13 are arranged to be drawn over the cow's teats to be securely held thereon. Each duct 13 at opposite points is provided with an elastic loop 17 forming a digit guard, the thumb and fingers being held within these elastic loops during the manipulation of the teats in the operation of milking the cow.

Near the lower end the conduit 12 is provided with the annular collar 18 preferably made of spring wire and having the two laterally extending operating ends 19 a suitable space being permitted between the ends 19 so that this ring or annulus can be contracted to decrease its diameter permitting the same to be sprung into the collar 8. This spring collar 18 is secured to the lower end of the conduit 12 and is covered by a rubber or other strip 20, so that this spring collar 18 in effect forms an integral part of the lower end of the conduit 12. The conduit 12 is secured to the collar 8 inserting the lower end into this collar 8 and then releasing the members 19 which find a seat within the enlargement 10 so that the conduit is held to the collar 8 in air tight connection.

In the use of the device, the ducts 13 are secured to the teats and upon manipulating the same the milk flows through the conduit 12 into the pail 5. If desired, but one of the ducts 13 may be employed as shown in the modification.

An incident of convenience to this arrangement of devices for milking purposes, is that the receptacle is entirely closed as the elastic conduit when not secured to the teats, hangs over the edge of the pail and so securely closes the collar opening within the lid.

The device is simple and inexpensive in construction and both durable and efficient in operation.

If desired, the conduit 12, only, may be employed without use of the duct, if one hand only is used in operation of milking.

Having thus described my said invention, what I claim as new and desire to secure by United States Letters Patent is:

1. In combination, a vessel, a lid provided with a collar having a marginal slot and enlargement, an elastic conduit having two branching ducts, each duct being provided with an elastic loop, and a spring ring secured to the lower end of said conduit with projecting operating stems said rings being held within said collar and said stem within said enlargement.

2. The combination with a vessel; of a lid having a collar provided with a marginal slot, an elastic conduit having elastic loops adjacent its upper end a spring ring secured to the lower end of the conduit and adapted for removable engagement with the slot and a covering disposed over said ring and between the conduit and the collar.

3. A device of the character described, comprising a vessel having a lid, a collar carried by said lid, said collar being provided with a marginal slot and an enlargement, a conduit and means carried by the lower end of the conduit for removably securing the same within the collar and in engagement with the slot.

In testimony whereof I affix my signature, in presence of two witnesses.

THOMAS WALTER HANKINS.

Witnesses:
T. J. WOLFE,
ED McKINLEY.